(12) United States Patent
Armstrong et al.

(10) Patent No.: US 6,491,021 B1
(45) Date of Patent: Dec. 10, 2002

(54) AIR INLET ARRANGEMENT FOR AN INTERNAL COMBUSTION ENGINE WITH A TORQUE DETERMINED THROTTLE SETTING

(75) Inventors: Neil Armstrong, Stuttgart (DE); Axel Bachmann, Esslingen (DE); Ralf Wörner, Weil der Stadt (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/629,552

(22) Filed: Jul. 31, 2000

(30) Foreign Application Priority Data

Aug. 6, 1999 (DE) .......................................... 199 37 123

(51) Int. Cl.[7] .............................................. F02D 41/02
(52) U.S. Cl. ..................................................... 123/350
(58) Field of Search ................... 123/350, 361

(56) References Cited

U.S. PATENT DOCUMENTS 4,640,243 A    2/1987   Abo et al. .................. 123/399

FOREIGN PATENT DOCUMENTS

| DE | 44 04 063 A 1 | 8/1995 | |
|----|---------------|--------|--|
| EP | 0 268 433 A 1 | 5/1988 | |
| JP | 1-167435      | * 7/1989 | .................. 123/337 |

* cited by examiner

*Primary Examiner*—Andrew M. Dolinar
(74) *Attorney, Agent, or Firm*—Crowell & Moring LLP

(57) ABSTRACT

An apparatus for setting the throttle position in an air feed or intake assembly of an internal combustion engine in accord with desired torque including a two setting, switchable suction pipe. Torque fluctuations are inhibited during the switchover between the two settings so that uncomfortable drivability related effects are eliminated.

8 Claims, 1 Drawing Sheet

Figure 1:
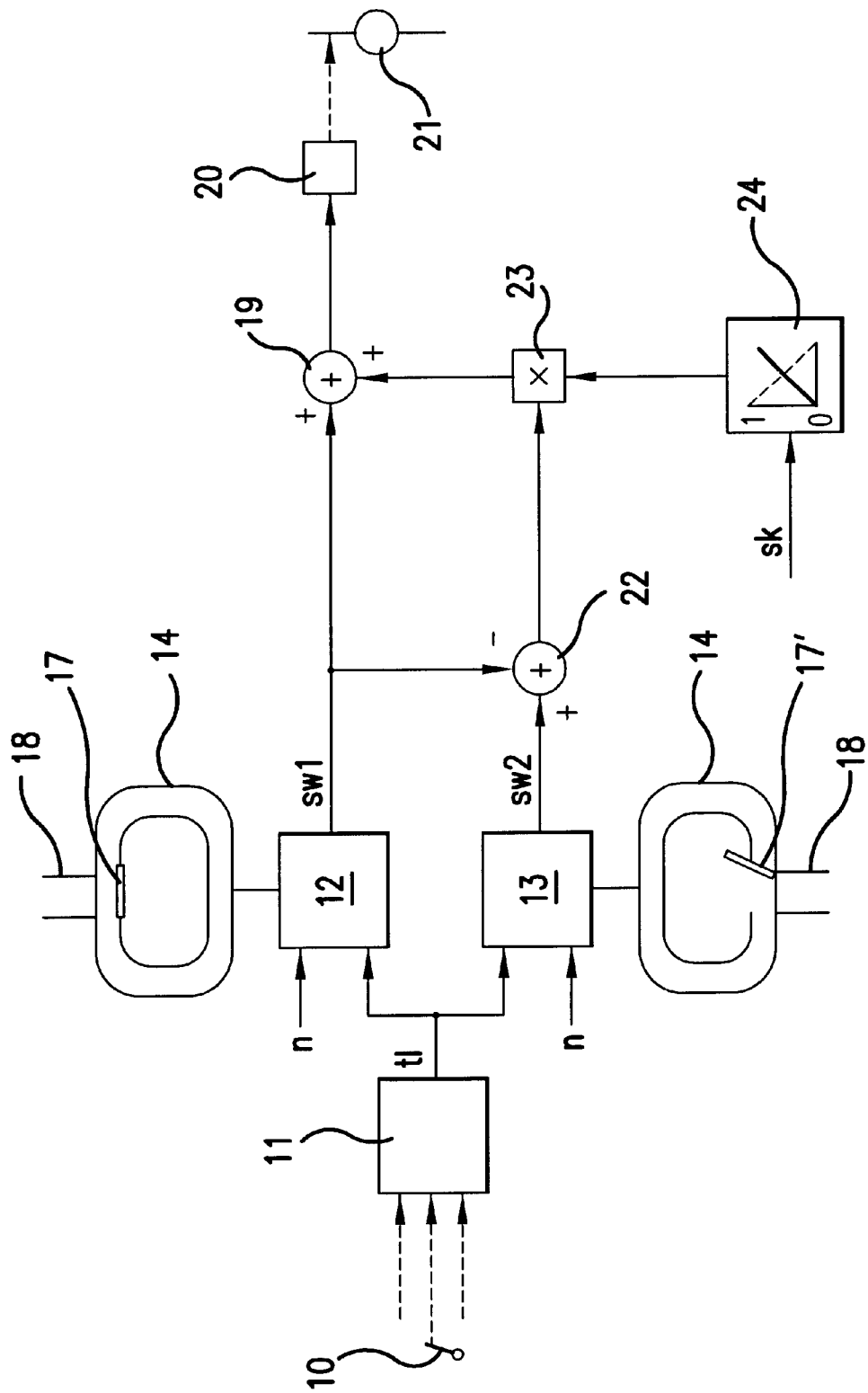

AIR INLET ARRANGEMENT FOR AN INTERNAL COMBUSTION ENGINE WITH A TORQUE DETERMINED THROTTLE SETTING

BACKGROUND OF THE INVENTION

1. Field of Invention

The invention relates to an apparatus for setting the throttle position in the air feed region of an internal combustion engine as a function of a desired torque, a device having at least two settings which can be switched over as a function of parameters and influence the degree of fill.

2. Description of Related Art

A known design of such a device is a so-called switchable suction pipe which has, for example, two feed channels of different length to the individual cylinders of the internal combustion engine in each case. The shorter feed channel is active in the higher speed range, and the longer one is active in the lower speed range, the switchover being performed by actuating a suction pipe flap. The feed channels of different length effect an improved degree of fill efficiency in the corresponding speed ranges, on the basis of resonance effects.

Since the switchover between the shorter and the longer feed channels would lead to a jump in torque, solutions have already been proposed to prevent this. One proposal is based on the principle of a suction pipe model, with the aid of which the change in degree of fill is simulated by a physical model. A disadvantage of this is the high computational outlay required therefor, and the fact that pressure pulsations, which participate largely in the change in degree of fill, cannot also be included. A further proposal is based on pilot control by means of a singular offset which is determined from a characteristic diagram dependent on the accelerator pedal/speed. One disadvantage of this proposal is the sudden change in the throttle angle, which scarcely deals with the real suction pipe dynamics. Jolting oscillations of the vehicle can occur as a consequence, and the failure to take account of the respectively most current accelerator pedal value and/or of the environmental influences (pressure, temperature) during the changeover operation can likewise lead to undesired fluctuations in degree of fill.

SUMMARY OF THE INVENTION

It is therefore the object of the present invention to create an apparatus of the generic type mentioned at beginning which achieves a comfortable switchover without jolting, self-acceleration of the vehicle and the like in conjunction with a low additional outlay on processor power and development costs.

The advantages of the apparatus according to the invention, reside, in particular, in the fact that it largely eliminates torque fluctuations in the case of switching operations of devices which influence degree of fill, the suction pipe flaps in switchable suction pipes, or also other actuators which influence degree of fill for the purpose of cylinder shut-down, valve switching or the like. Jolting of the vehicle which impairs comfort, or even self-acceleration during switchover operation can be effectively prevented. This is achieved by an extremely simple and cost-effective solution which necessitates only relatively low outlay on processor power. In this case, the vehicle always remains dynamically controllable, that is to say the torque desired by the driver or other electronic devices is continually taken into account. A further advantage consists in that there is no departure from an operating point optimised for efficiency, for example a lambda value of 1 and an optimum ignition angle are retained. This is achieved, in particular, also by virtue of the fact that weighted interpolation is carried out between the two characteristic diagrams during the switchover operation for a temporally limited period.

Advantageous developments and improvements of the apparatus specified in claim 1 are possible by means of the measures set forth in the subclaims.

The apparatus according to the invention can be applied in a particularly advantageous way in the case of a switchable suction pipe with a suction pipe flap which is switched over as a function of engine speed.

For the purpose of preferably linear conversion from one prescribed value into the other, in particular during a fixed prescribable period, in an advantageous design of the circuit a subtraction stage is constructed for forming the difference of the prescribed values and a multiplier stage is constructed for multiplying the difference value by a ramp function, the ramp function running in each case between the values 0 and 1, and an adder stage being designed for adding the output value of the multiplier stage to one of the prescribed values.

In order to prevent frequent switching to and fro in the speed transition range, the switchover operations between the positions are preferably affected by hysteresis.

BRIEF DESCRIPTION OF THE INVENTION

An exemplary embodiment of the invention is illustrated in the drawing and explained in more detail in the following description. In the drawing:

FIG. 1 shows a schematic block diagram, according to an apparatus for setting the throttle position, as an exemplary embodiment of the invention,

DESCRIPTION OF THE PREFERRED EMBODIMENT

In the exemplary embodiment illustrated in FIG. 1, an accelerator pedal 10 which can be actuated by a driver of a vehicle acts on a function stage 11 in which the desired torque communicated by the driver via the accelerator pedal is converted in a known way into a fill or a degree of fill t1 which is made available to the internal combustion engine, and which corresponds to the desired torque. Dashed lines indicate that yet further function stages can act on the function stage 11 in a likewise usual way, such as a cruise controller, an anti-knock controller or other electronic control systems for vehicle monitoring. An internal priority controller ensures that the most important prescription is given priority in each case.

The signal, present at the output of the function stage 11, for the degree of fill t1 or the desired degree of fill acts on two characteristic diagrams 12 or 13 dependent on speed and degree of fill. For this purpose, said diagram is also respectively fed the engine speed signal n. The input values of speed and degree of fill are used by these characteristic diagrams 12, 13 to generate an output signal for setting the associated throttle angle sw1 and sw2. These two characteristic diagrams are assigned two settings of a switchable suction pipe 14.

The characteristic diagram 12 is designed for the lower speed range, that is to say for the state of the switchable suction pipe with a closed suction pipe flap 17, and the characteristic diagram 13 is designed for the higher speed range with an open suction pipe flap 17'. A feed channel 18 opening into each of the switchable suction pipes 14 serves to feed air to the succeeding cylinder on the opposite side. The longer feed channel is active in the lower speed range where the flap 17 is closed and the shorter feed channel is active in the higher speed range where the flap 17' is open. The output signal sw1 of the characteristic diagram 12 is fed via an adder stage 19 to an actuator 20 for the throttle 21 in the suction pipe of the internal combustion engine.

In the lower speed range with a closed suction pipe flap, the throttle setting of the throttle 21 is therefore determined solely by the characteristic diagram.

If the suction flap is now opened upon overshooting of the prescribable or calculable speed value, the switchover to the control by the second characteristic diagram 13 is performed via a ramp, that is to say the throttle angle control signal sw1 is converted via a ramp into the throttle angle control signal sw2. This is done by firstly forming a difference value between the signals sw1 and sw2 in a subtraction stage 22. This difference signal is fed to a multiplier stage 23 and multiplied there by the signal of a ramp generator 24 which generates a ramp signal between the value 0 and the value 1, when a switchover signal sk for opening the suction tube flap is applied. The output signal of the multiplier stage 23 which is formed is added to the signal sw1 in the adder stage 18, such that the desired transition takes place within the stipulated time interval set by the ramp generator 24. Conversely, a switch-back signal upon closure of the suction pipe flap leads to an inverted ramp of the ramp generator 24, that is to say to conversion of the signal 1 into a signal 0 (dashed illustration).

The gradient of the ramp of the ramp generator 24 can, of course, also be set by dynamic variables and/or by the characteristic diagrams 12, 13.

The throttle angle varies as a function of time. The instant t1 is the instant at which the suction pipe flap is closed in the switchable suction pipe 14, that is to say is switched over from the shorter air path to the longer air path. In order to prevent a jump in torque, the angular position of the throttle 21 is converted via a ramp to a lower value. Without the compensation by the suction pipe circuit according to the invention, there would be a jump in torque.

Consequences may arise as a function of the degree of fill. Without compensation by the suction pipe circuit according to the invention an enduring stationary error in the degree of fill would occur and could lead, for example, to an undesired acceleration of the vehicle. In the case of a switchover between the characteristic diagrams without ramp conversion, however, a jump in degree of fill would result and would lead to jumps in torque and thus to jolting of the vehicle.

The invention is, of course, not limited to the application for a switchable suction pipe 14 having two air feed paths of different length, but can also be applied, for example, to switchable suction pipes which have a larger number of air feed channels of different length. The number of the characteristic diagrams can also be used to switch over between the different air feed channels, instead of a suction pipe flap.

Furthermore, the apparatus according to the invention can also be used for other actuators which influence the degree of fill, for example an apparatus for shutting down cylinders, a cam shaft actuator or another apparatus for valve switching.

We claim:

1. Apparatus for setting a throttle position in an air feed region of an internal combustion engine as a function of a desired torque, comprising a device having at least two settings which can be switched over as a function of parameters and influence degree of fill, characterized in that each setting is assigned a characteristic diagram, which is a function of engine speed and degree of fill or a function of engine speed and desired torque, for purposes of prescribing a throttle position, a ramp generator being provided for converting a prescribed value of one characteristic diagram into a prescribed value of another characteristic diagram in an event of switching over between corresponding settings.

2. Apparatus according to claim 1, wherein the device having at least two settings which can be switched over as a function of parameters is constructed as an suction pipe arrangement in the air feed region with in each case two feed channels of different lengths to the individual cylinders of the internal combustion engine, one parameter being provided as a function of switching over between these feed channels.

3. Apparatus according to claim 2, wherein a suction pipe flap is provided in each case for switching over.

4. Apparatus according to claim 2 or 3, wherein a switch over is provided as a function of engine speed, in which case a longer feed channel is respectively active in the lower speed range, and a shorter feed channel is active in the higher speed range.

5. Apparatus according to claim 1, wherein the ramp generator is designed for linear conversion of one prescribed value into the other, this conversion being performed, in particular, during a fixed prescribable period.

6. Apparatus according to claim 5, wherein a subtraction stage is constructed for forming the difference of the prescribed values and a multiplier stage is constructed for multiplying the difference value by a ramp function, the ramp function running in each case between the values 0 and 1 and in that an adder stage is designed for adding the output value of the multiplier stage to one of the prescribed values.

7. Apparatus according to one of claims 1 to 3, wherein the ramp generator is designed to convert from one prescribed value into the other as a function of parameters, this conversion being performed, in particular, during a parameter-dependent period.

8. Apparatus according to claim 5, wherein the switchover operations between the settings are affected by hysteresis.

* * * * *